United States Patent
Englbrecht et al.

(10) Patent No.: US 11,724,664 B2
(45) Date of Patent: Aug. 15, 2023

(54) GAS GENERATOR FOR VEHICLE SAFETY SYSTEM, AIRBAG MODULE AND VEHICLE SAFETY SYSTEM

(71) Applicant: ZF Airbag Germany GmbH, Aschau a. Inn (DE)

(72) Inventors: Karl Englbrecht, Töging (DE); Johannes Ebner, Mühldorf (DE); Hans-Peter Neumayer, Ampfing (DE); Benedikt Peters, Munich (DE)

(73) Assignee: ZF Airbag Germany GmbH, Aschau a. Inn (DE)

( * ) Notice: Subject to any disclaimer, the term of this patent is extended or adjusted under 35 U.S.C. 154(b) by 0 days.

(21) Appl. No.: 17/572,994

(22) Filed: Jan. 11, 2022

(65) Prior Publication Data
US 2022/0297631 A1    Sep. 22, 2022

(30) Foreign Application Priority Data

Jan. 11, 2021   (DE) .......................... 102021100262.1

(51) Int. Cl.
*B60R 21/264*   (2006.01)
*B60R 21/36*    (2011.01)

(52) U.S. Cl.
CPC ............ *B60R 21/264* (2013.01); *B60R 21/36* (2013.01)

(58) Field of Classification Search
CPC .. B60R 2021/26242; B60R 2021/2648; B60R 21/262; B60R 2021/26041
See application file for complete search history.

(56) References Cited

U.S. PATENT DOCUMENTS

| | | | |
|---|---|---|---|
| 6,253,683 B1 | 7/2001 | Fukabori | |
| 6,601,872 B2 * | 8/2003 | Zimbrich | B60R 21/272 280/741 |
| 8,651,520 B2 * | 2/2014 | Jung | F42B 3/045 280/741 |
| 2004/0130133 A1 | 7/2004 | Yamazaki et al. | |
| 2011/0169252 A1 * | 7/2011 | Young | B60R 21/274 280/737 |
| 2017/0166162 A1 * | 6/2017 | Last | B60R 21/274 |

FOREIGN PATENT DOCUMENTS

| | | | | |
|---|---|---|---|---|
| DE | 19933551 A1 | | 1/2001 | |
| DE | 102014018603 A1 | * | 6/2016 | ........... B60R 21/264 |
| DE | 102015016082 A1 | * | 6/2017 | |
| DE | 202018100870 U1 | | 12/2018 | |
| EP | 0943502 A1 | * | 3/1999 | |
| JP | 2000135964 A | | 5/2000 | |
| KR | 1020180005022 A | | 1/2018 | |

* cited by examiner

*Primary Examiner* — Nicole T Verley
(74) *Attorney, Agent, or Firm* — Kristin L. Murphy (57) ABSTRACT

The disclosure relates to a gas generator for a vehicle safety system, comprising a first ignition stage, and a second second ignition stage. The first ignition stage comprises a cup-shaped diffuser with a diffuser base and an adjacent diffuser sidewall (57). The first ignition stage, the diffuser and the second ignition stage are arranged along an axial longitudinal axis of the gas generator and the diffuser is positioned between the first and second ignition stages such that the second ignition stage is fastened on an outer area of the diffuser.

20 Claims, 3 Drawing Sheets

GAS GENERATOR FOR VEHICLE SAFETY SYSTEM, AIRBAG MODULE AND VEHICLE SAFETY SYSTEM

This application claims priority to German Patent Application No. 102021100262.1, filed Jan. 11, 2021, the disclosure of which is incorporated herein by reference in its entirety.

TECHNICAL FIELD

The disclosure relates to a gas generator, in particular for a vehicle safety system. Further, the disclosure deals with an airbag module comprising such gas generator and with a vehicle safety system including such gas generator.

BACKGROUND

As is known, gas generators are used for various safety devices, in particular in vehicles. Gas generators allow for gas to be generated and/or released, said gas being capable of filling an inflatable airbag, for example, thus causing a person to be protected in the case of crash. It is also possible to operate, by said gas generator, other safety systems such as a belt tensioner, a movable headrest or roll bar or a hood prop in a vehicle.

It is also known to employ gas generators having plural ignition stages such as a first ignition stage and a second ignition stage, each of which can initiate gas generation to enable generations of gas separated from each other in time and/or in space. Such gas generator may additionally comprise a diffuser which acts as a mixing chamber by receiving at least partially gas generated by each of the first and second ignition stages, before said gas can exit the gas generator to the outside in order to fill an airbag connected to the gas generator, for example. Such gas generator may further comprise a plurality of additional components.

It is further known to connect, in a gas generator, an ignition stage which may also comprise pre-loaded compressed gas to a diffuser by inserting the ignition stage with one end of its housing at least partially into an opening of the diffuser and fastening the same there. In other words, a part of the end-side housing portion of the ignition stage protrudes into an inner area of the diffuser so that, in a case of operation of the gas generator, gas can be guided out of the end-side housing portion of the ignition stage into the diffuser and, resp., the inner area of the diffuser. In other words, the ignition stage is inserted, in the way of a gas lance in which gas can be guided in the case of operation, in the diffuser and in the inner area thereof, respectively.

Against this background, what is needed is a gas generator that can be manufactured and, resp., mounted easily and at low cost, with the number of components thereof being as small as possible.

Accordingly, there is also a need for the diffuser to be easy to mount with respect to an ignition stage.

There is also a need for an airbag module comprising a gas generator and a vehicle safety system comprising a gas generator.

SUMMARY

In accordance with the disclosure, a gas generator, of the subject matter of claim 1, with respect to the airbag module of the subject matter of claim 11, and with respect to the vehicle safety system of the subject matter of claim 12.

The disclosure is based on the idea of a gas generator, in particular for a vehicle safety system, comprising a first ignition stage, a cup-shaped diffuser having a diffuser base and a diffuser sidewall, and a second ignition stage, wherein the first ignition stage, the diffuser and the second ignition stage are disposed along an axial longitudinal axis of the gas generator and the diffuser is positioned between the first and second ignition stages such that the second ignition stage is fastened to an outer area of the diffuser. As the second ignition stage is advantageously fastened to an outer area of the diffuser, the second ignition stage can be connected and, resp., fastened to an easily accessible area of the diffuser. Thus, during assembly of the gas generator, a complicated positioning of the second ignition stage opposite to the diffuser can be avoided. In particular, it is not necessary and can be equally avoided to insert the second ignition stage or at least a portion thereof into the interior or an inner area of the diffuser and to position the same there.

In accordance with the present disclosure, by the term ignition stage including a subassembly or subunit of the gas generator is understood to be composed of a plurality of components. For example, such ignition stage may comprise, apart from an igniter initiating an ignition or activation of the gas generator, if necessary, also an igniter holder, a plug having a bursting element and a booster charge, a container that is optionally configured as a compressed gas tank filled with compressed gas, another plug having a bursting element, and a propellant, Such an ignition stage may be a first ignition stage and may already substantially form, along with another second ignition stage and the diffuser, the entire gas generator.

In one exemplary arrangement, in the gas generator the diffuser base forms a longitudinally axial termination of the diffuser, and/or the second ignition stage is fastened, for example adhesively, to the diffuser sidewall or the diffuser base. As the diffuser base advantageously forms a longitudinally axial termination of the diffuser, during manufacture of the gas generator the diffuser base is easily and unambiguously visible, for example by a camera system, as an element delimiting the diffuser in the axial direction and can be easily and safely "started" in an automated manner by a tool which receives a (second) ignition stage to be attached to the diffuser so as to quickly and safely position the (second) ignition stage on the diffuser sidewall and the diffuser base and fasten said ignition stage there, for example by a welded connection.

The diffuser can overlap, over a certain distance along an outer area of its diffuser sidewall, with the second ignition stage and can be fastened to the latter, wherein for example, an outer diameter of the diffuser may substantially correspond to an inner diameter of the second ignition stage. The term "substantially" in this context is intended to mean that the diffuser can be inserted with its diffuser sidewall into the second ignition stage while contacting the latter, for example in the way of a press-fit. During assembly of the gas generator, in one exemplary arrangement, the second ignition stage can advantageously be attached to the diffuser in a simple and cost-efficient manner, Specifically, it can be slipped onto or attached to the end of the diffuser which includes the diffuser base. During assembly of the gas generator, also the second ignition stage can be fixed and the diffuser can be moved by being inserted or press-fitted to some extent into the second ignition stage. It is also an advantage of the gas generator according to the disclosure that the second ignition stage does not extend into the diffuser or, resp., into an inner area of the diffuser. This prevents a volume in the inner area of the diffuser from being blocked or "loaded" or "used up" by the second ignition stage. Thus, a corresponding larger volume is available inside the diffuser and, consequently, a correspondingly larger mixing chamber can be provided for especially proper mixing of the gases generated by the first and second ignition stages.

In one exemplary arrangement, each of the first ignition stage, the diffuser and the second ignition stage can form outer housing portions of the gas generator and can be positioned relative to each other so that the first ignition stage is inserted in the interior of the diffuser and the diffuser is inserted in the interior of the second ignition stage each over a particular axial length. In this case, too, it could be stated that the components of second ignition stage, diffuser and first ignition stage are arranged to be nested, stacked or inserted into each other. For example, in one exemplary arrangement, the first ignition stage can be closed, at its end facing the diffuser, by a second plug, and the second ignition stage can be closed, at its end remote from the diffuser, by a second ignition unit and thus can form, just as the diffuser, a substantially U-shaped or cup-shaped housing portion including a sidewall and a bottom area. Said three U-shaped housing portions in the form of the first and second ignition stages and the diffuser then can be aligned with each other along the axial longitudinal axis of the gas generator such that their bottom areas face the same direction, and especially such that the diffuser is inserted to some extent in the second ignition stage and the first ignition stage is inserted to some extent in the diffuser and, resp., they are positioned to overlap with each other. Such nested positioning of the first and second ignition stages and the diffuser may have a beneficial effect during manufacture of the gas generator, in particular concerning the feeding or feeding direction of said individual components or prefabricated subassembly on an assembly line.

The diffuser, in particular the diffuser base, may close an open second end area of the second ignition stage and/or can form a terminating wall for a second combustion chamber of the second ignition stage. Advantageously, it is therefore not necessary to use, apart from the diffuser, an additional component which would close the second ignition stage and/or would form a terminating wall for the second combustion chamber of the second ignition stage.

The diffuser in this case can seal, advantageously as a single component, the second ignition stage to the outside and, at the same time, can close and, resp., delimit an inner chamber of the second ignition stage, i.e., the combustion chamber thereof. In particular, the diffuser can be regarded as a component here which closes or seals the second ignition stage at an axial end thereof. Although the diffuser and the second ignition stage are parts which are separate from each other, thus particularly the diffuser can also be understood to be part of the outer housing of the second ignition stage. In particular, such subassembly of the diffuser and the second ignition stage can already be regarded as a gas generator or a gas generator stage having independent and, resp., full operational capability. In other words, one of the various safety devices as described in the foregoing can already be operated to the full extent by this subassembly.

As the diffuser may form a terminating wall for a second combustion chamber of the second ignition stage, also known components of a known combustion chamber, such as, e.g., a pyrotechnic propellant, a volume compensation acting upon the latter and/or a compressed gas or compressed gas mixture pre-stored prior to activation of the gas generator, may directly abut on or be adjacent to the diffuser, particularly to the diffuser base. In this way, advantageously the interior of the second ignition stage which is also delimited by the diffuser is optimally utilized. In other words, apart from the diffuser, no further wall terminating the second combustion chamber is required, neither is any further space extending in the axial direction necessary in this way which would be formed between the diffuser and a further wall, thereby allowing the overall length of the gas generator to be advantageously minimized.

In one exemplary arrangement, the diffuser includes at least one, especially two, outlet openings in its diffuser sidewall and at least one flow opening in its diffuser base, wherein, in one exemplary arrangement, the at least one outlet opening is a slotted opening extending especially radially in the circumferential direction, and/or the at least one flow opening is in the form of a round opening. The fact that the diffuser has at least one opening in each of its sidewall and its bottom, allows gas to flow out of and, resp., into the diffuser in the radial and axial directions, wherein especially via the flow opening(s) in the diffuser base gas can flow out of the second ignition stage, which can be activated simultaneously with or before or after the first ignition stage, through the flow opening(s) into the inner area of the diffuser. The fact that two outlet openings which are positioned opposite to each other radially in the circumferential direction are disposed in the diffuser sidewall allows to indicate a so-called thrust-neutral gas generator which, after being activated, enables a gas flow or gas jet of substantially equal intensity and substantially acting in opposite directions into the environment of the gas generator.

Advantageously, in such gas generator, when the gas generator is not activated, the at least one outlet opening is unsealed and the at least one flow opening is sealed by an over-ignition protector, wherein especially the over-ignition protector forms part of a/the terminating wall for a/the second combustion chamber of the second ignition stage. Accordingly, when the first ignition stage is activated and when gas has flown from said ignition stage into the interior of the diffuser, said gas can flow to the outside through the unsealed outlet opening(s) of the diffuser without any major time delay. However, such gas cannot flow out of the diffuser into the second ignition stage, as this path is blocked by the over-ignition protector, thus preventing inadvertent activation of the second ignition stage and, resp., inadvertent ignition of a propellant of the second ignition stage. The fact that in particular the over-ignition protector forms part of a/the terminating wall for a/the second combustion chamber of the second ignition stage, may advantageously cause, when the second ignition stage is activated, gas or gas pressure out of or in the second combustion chamber to act directly and extremely quickly upon the over-ignition protector in order to open or tear the latter as intended so that the gas or the gas pressure can flow into the diffuser and, resp., out of the second ignition stage.

In one exemplary arrangement, the over-ignition protector may have, especially at both of its front faces, a predetermined breaking point and may be fastened to the diffuser base, and in one exemplary arrangement, to the inner face thereof, by a first fastening and/or a second fastening, wherein the first fastening is configured as a spot-welded connection and the second fastening is configured as a radially circumferential welded connection. A predetermined breaking point in accordance with the present disclosure is understood to be an area in or at the over-ignition protector that has a smaller residual wall thickness than the remaining area of the over-ignition protector surrounding the predetermined breaking point. Such predetermined breaking point may be produced in different ways such as by material displacement or abrasion, for example by notching, embossing, grinding or laser abrasion, and may also include diverse geometric shapes and may include, for example, one single or plural straight or curved lines, and may especially be provided in the form of a star-shaped embossing.

As the over-ignition protector is fastened to the diffuser base by first and second fastenings, the over-ignition protector can advantageously be held reliably on the diffuser base at least at said two fastenings, when the over-ignition protector is intendedly opened or torn to release a path for gas from the second ignition stage into the diffuser. This allows for an advantageous configuration of the over-ignition protector such that no inadvertent larger or disadvantageously shaped segments of the opened or torn over-ignition protector can be formed which might adversely affect a gas flow inside the gas generator. Because in one exemplary arrangement, the first fastening is configured as a spot-welded connection and the second fastening is configured as a radially circumferential welded connection, the predetermined breaking point can be formed advantageously between said two fastenings so as to open, if the over-ignition protector is opened or torn, the over-ignition protector only precisely between said two fastenings. Thus, advantageously an extremely precisely defined area of the over-ignition protector and, resp., of the predetermined breaking point thereof can be torn or opened, and very specific outflow or overflow of gas out of the second ignition stage through the opened predetermined breaking point can be adjusted.

In one exemplary arrangement, the gas generator is a hybrid gas generator whose first ignition stage includes a compressed gas tank which, when the gas generator is not activated, receives compressed gas or a compressed gas mixture and particularly a first propellant, or the gas generator is a purely pyrotechnic gas generator which includes no compressed gas when it is not activated. Accordingly, the gas generator may have a first ignition stage which includes a pre-stored compressed gas or a compressed gas mixture, preferably comprising gas from the group of oxygen, helium and nitrogen, in particular at a pressure of 600 bars at room temperature. Optionally, the second ignition stage may also include a corresponding pre-stored compressed gas or a compressed gas mixture or may be present as a purely pyrotechnic stage without any compressed gas (mixture). As an alternative, both ignition stages of the gas generator may not include any compressed gas so that, in such case, the gas generator on the whole is also provided as a purely pyrotechnic gas generator. These variation possibilities illustrate an advantageously flexible use of the gas generator according to the disclosure.

In one exemplary arrangement, the second ignition stage of the gas generator may be a purely pyrotechnic stage comprising a second propellant, wherein the diffuser forms an axial end of the outer housing of the second ignition stage which is especially axially opposed to a second ignition unit forming another end of the outer housing of the second ignition stage. A second ignition stage configured in this way may already be regarded, as described already further above, as a gas generator or a gas generator stage having an independent and, resp., full operational capability and, considered per se, can already operate a safety device to the full extent, as described further above. In particular, the diffuser, the second ignition stage and the second ignition unit do not only comprise the outer housing of the independent gas generator stage, but already completely constitute the same.

Another independent aspect of the disclosure relates to an airbag module comprising a gas generator, an airbag inflatable by the gas generator and a fastener for attaching the airbag module to a vehicle, with the gas generator being configured according to the disclosure, as described above.

An additional independent aspect of the disclosure relates to a vehicle safety system, particularly for the protection of a person such as a vehicle occupant or a pedestrian, comprising a gas generator, an airbag inflatable by the latter as part of an airbag module, and an electronic control unit by which the gas generator can be activated in the event of a situation of release, the gas generator being configured according to the disclosure as described above.

BRIEF DESCRIPTION OF THE DRAWINGS

In the following; the disclosure is described in detail by way of exemplary arrangements with reference to the attached schematic figures, wherein.

DETAILED DESCRIPTION

Hereinafter, like reference numerals will be used for like and equally acting parts.

Figure 1:
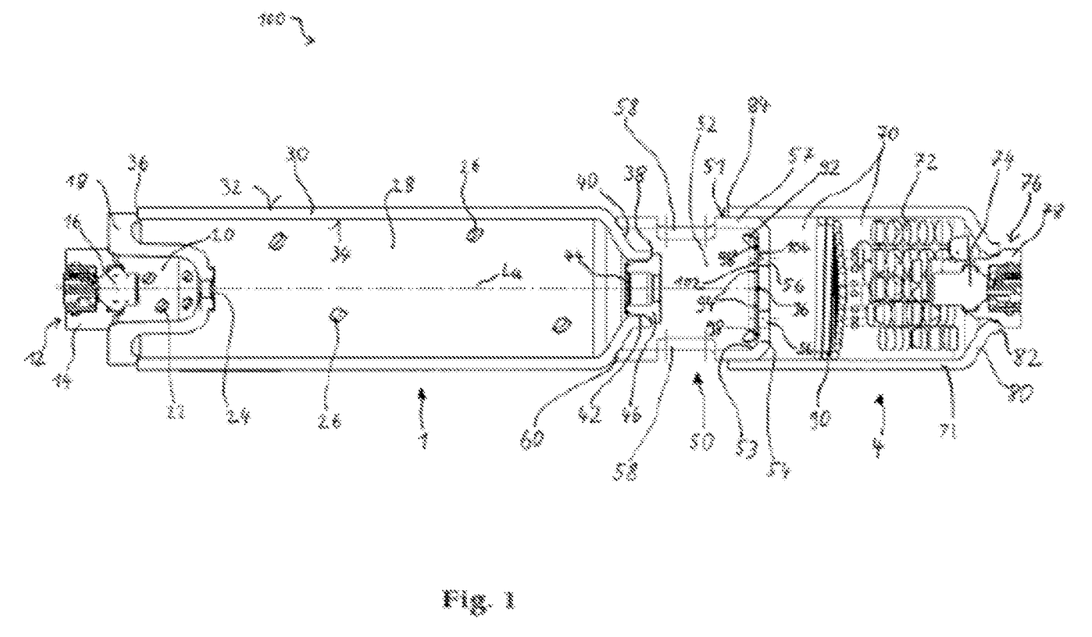
FIG. 1 shows a longitudinal section view across a gas generator according to the disclosure.

FIG. 1 shows a longitudinal section across a gas generator 100 having a longitudinal axis La which has a shape extending longitudinally in an axial direction and is especially suited for being installed in a vehicle safety system. The gas generator 100 includes a plurality of individual components, and in the exemplary arrangement shown, three subassemblies thereof. In one exemplary arrangement, the subassemblies are in the form of pre-mountable structural units of plural individual components, forming substantially the entire gas generator 100. In the representative arrangement shown, said three subassemblies are in the form of a first ignition stage 1, a second ignition stage 4 and a diffuser 50, and can be mounted and fastened to each other and can also form, by their respective housing portions, at least partially an outer housing of the gas generator 100. The first ignition stage 1 includes a compressed gas tank 30, which is an axially elongate tubular, and in one exemplary arrangement, substantially cylindrical, component that is open at its two front-side ends. A first end 36 is in the form of an opening of the compressed gas tank 30 having an inner diameter which substantially corresponds to the, and in one exemplary arrangement, a maximum, inner diameter of the compressed gas tank 30, along the entire cylindrical housing thereof. The compressed gas tank 30 includes a second end 38 which is axially opposite to the first end 36 and which includes an outlet opening 42 having a smaller inner diameter than the opening of the first end 36. The housing of the compressed gas tank 30 is shaped to be inwardly tapered over a certain distance in a surrounding area of the second end 38. More specifically, the cylindrical wall portion of the compressed gas tank 30 merges, in the direction of the second end 38 along said certain distance, into a taper 40 extending toward the longitudinal axis La of the gas generator 100 plotted in FIG. 1. The taper 40 then merges toward the second end 38 again into a terminating wall section which is substantially aligned in parallel to the cylindrical wall portion of the compressed gas tank 30 and forms the outlet opening 42. In other words, the compressed gas tank 30 has a housing portion retracted toward its second end 38 which comprises the taper 40.

The first end 36 of the compressed gas tank 30 is closed by a first plug 18 also forming a front-side termination of the gas generator 100. The first plug 18 is formed by a massive cup-shaped component having a sidewall and a bottom area, with a radially circumferential outwardly directed flange-type extension of the first plug 18 being connected, and in one exemplary arrangement, welded, to the compressed gas tank 30. In one exemplary arrangement, the first plug 18 is made from metal and closes the compressed gas tank 30, for example in a pressure-tight manner, at its first end 36. The first plug 18 is provided, starting from its flange-type extension, with a substantially cylindrically shaped sidewall which merges into the bottom area that is aligned substantially perpendicularly to the sidewall so that the first plug 18 with its bottom area and the sidewall is substantially cup-shaped. The bottom area of the plug includes one single central opening which is sealed in a pressure-tight manner by a first bursting element 24. Specifically, the first bursting element 24 may comprise a disk-shaped metal part with an optional predetermined breaking point which is welded onto the bottom area of the first plug 18, such as, for example, onto the outer surface thereof, in a radially circumferential manner, whereby the first plug 18 together with the first bursting element 24 fixed thereto seals the compressed gas tank 30 in a pressure-tight manner. The first plug 18 is closed on its open side facing its bottom area by a first ignition unit 12 in the form of a pre-mounted subassembly, wherein a first igniter holder 14 forms the first ignition unit 12 together with a first igniter 16 which the first igniter holder 14 receives. Accordingly, the first igniter holder 14 can be made from metal and can be welded to be radially circumferential to the open side of the first plug 18 to seal the first plug 18 in this way.

In its inner area, the first plug 18 forms an ignition chamber 20 which may optionally be filled with a booster charge 22. In particular, the ignition chamber 20 comprises the volume resulting from the interior of the first plug 18 and the first ignition unit 12 fixed to the plug 18 as a delimitation of the ignition chamber 20. The booster charge 22 may comprise a known pyrotechnic material which may include especially plural individual bodies, for example in the form of pellets, rings, disks or granules, and may be used when needed to assist or increase the effect of the first igniter 16 when the gas generator 100 is activated, and/or to open the first bursting element 24 as intended. In concrete terms, the booster charge 22 can be ignited by the first igniter 16 and can serve for subsequent ignition of a propellant and/or can effectuate or assist an intended opening of the first bursting element 24 by appropriate pressure formation.

The second end 38 of the compressed gas tank 30 and, thus, also the outlet opening 42 are sealed by a second plug 46 which equally forms a front-side termination of the gas generator 100. Accordingly, the second plug 46 is formed by a substantially tubular component open at its opposite front faces and acts as a holding element for a second bursting element 44 by which the second plug 46 is sealed on one of its open front faces. Specifically, the second plug 46 with the sealing second bursting element 44 fixed thereto is inserted, as a pre-mounted subassembly, in the outflow opening 42 such that the second bursting element 44 is directed to the inner area of the compressed gas tank 30. The second bursting element 44 may optionally comprise a predetermined breaking point and is fixed to the corresponding front face of the second plug 46 by radially circumferential welding in a pressure-tight manner. The second plug 46 is welded by a base-type extension formed thereon radially circumferentially to the second end 38 of the compressed gas tank 30 so that, together with the second bursting element 44, it seals the outlet opening 42 in a pressure-tight manner.

The compressed gas tank 30 includes an outer face 32, which also constitutes a segment of the outer housing of the gas generator 100, and an inner face 34 opposite to the outer face 32 which substantially delimits the interior of the compressed gas tank 30. The interior of the compressed gas tank 30 and, resp., the inner face 34 thereof and the two front-side plugs thereof, viz. the first plug 18 with the first bursting element 24 and the second plug 46 with the second bursting element 44, help confine or comprise a chamber and, resp., a volume in the form of a first combustion chamber 28. The first combustion chamber 28 may include at least partially a pyrotechnic first propellant 26 which can comprise, particularly as a filling, single propellant bodies such as, e.g., compressed, for example, dry-pressed propellant pellets or extruded bodies, but can also be provided in the form of broken granules or in the form of a monolithic molded body or in the form of lined-up disks or rings. Also, the first combustion chamber 28 can include a gas or compressed gas or a compressed gas mixture, and in one exemplary arrangement containing gas from the group of oxygen, helium and nitrogen, particularly at a pressure of 600 bars at room temperature. The compressed gas tank 30 thus can be quasi pressurized, before the gas generator 100 is activated, by such pressure and can consequently represent a component or subassembly for a hybrid gas generator.

The gas generator 100 now can be a purely pyrotechnic gas generator in which the compressed gas tank 30 is filled only with the first propellant 26 and not with a pre-loaded compressed gas, or it can be configured as a hybrid gas generator, wherein the compressed gas tank 30 is either filled with the pre-loaded compressed gas/compressed gas mixture only and thus not with a first propellant, or wherein the compressed gas tank 30 is filled both with the first propellant 26 and with the pre-loaded compressed gas/compressed gas mixture. In all of those cases, an operative gas generator and, resp., an operative first ignition stage 1 is provided for the gas generator 100.

According to the foregoing description, in accordance with the present disclosure the first ignition stage 1 comprises particularly the components of first igniter 16, first igniter holder 14, booster charge 22, first plug 18 with first bursting element 24, first propellant 26, a pre-loaded compressed gas/compressed gas mixture, compressed gas tank 30 and second plug 46 with second bursting element 44, and, respectively, the first ignition stage 1 can be understood to be a subassembly comprising said components.

Furthermore, FIG. 1 illustrates that in the gas generator 100 the diffuser 50 is in the form of a cup-shaped component in which a diffuser sidewall 57 takes a substantially cylindrical shape and constitutes a sidewall of the cup-shaped component, wherein the diffuser sidewall 57 merges integrally into a diffuser base 54 so that the diffuser base 54 is thus connected directly and integrally to the diffuser sidewall 57. In doing so, the diffuser sidewall 57 merges into the diffuser base 54 by a properly inwardly bent or curved extension so that the diffuser base 54 is aligned substantially perpendicularly to the diffuser sidewall 57 and, thus, forms a bottom of the cup-shaped component.

Axially opposed to the diffuser base 54, the diffuser 50 is open and, thus, at that position has an opening 60 whose diameter substantially corresponds to the inner diameter of the (cylindrical) diffuser sidewall 57. The diffuser sidewall 57 includes at least one outlet opening 58 disposed there as an opening or breakthrough through the material. Specifically, two outlet openings 58 of this type are disposed in the diffuser sidewall 57 in the form of slotted openings elongated radially in the circumferential direction. The two outlet openings 58 are disposed, in the way of windows, to be opposite approximately to the axial center of the elongate diffuser 50. Such configuration of the outlet openings 58 of the diffuser 50 permits, after/when the gas generator 100 is activated, so-called thrust-neutral flow of gas out of the interior of the diffuser 50 through the outlet openings 58 into an outer area of the gas generator 100. In other words, such configuration prevents the gas generator 100 from being exposed, when activated, to significant thrust in a specific direction by gas flows exiting the diffuser 50.

The diffuser base 54 has at least one flow opening 56 which is especially configured as a linear and, resp., cylindrically shaped opening through the material. More specifically, the diffuser base 54 includes a total of eight flow openings 56 which are arranged to be radially circumferential along a circular path at equal spacings from each other. The number of the, especially circular, flow openings 56 and/or the geometry and position(s) of the flow openings 56 in the diffuser base 54 may also vary as required.

A diffuser chamber 52 which can also act as a mixing chamber and/or a gas expansion chamber, when the gas generator 100 is activated, is formed inside the diffuser 50. In particular, gases from different ignition stages, specifically of the first and second ignition stages (1, 4), can mix there and/or else reduce their gas pressure and, consequently, expand as regards the pressure level thereof.

The diffuser 50 has an inner face 53 which faces the interior of the diffuser 50 and also delimits the diffuser chamber 52, and the diffuser 50 has an outer area 51 which comprises the outer contour of the diffuser 50 and is thus opposed to the inner face 53.

At the inner face 53 of the diffuser 50, specifically at the inner face 53 of the diffuser base 54, another separate component, viz. an over-ignition protector 92, is tightly connected or mounted. Alternatively, the over-ignition protector 92 could also be arranged in the outer area 51 of the diffuser 50 in the region of the diffuser base 54. The over-ignition protector 92 is designed as a substantially disk-shaped component of metal, particularly steel, and on its periphery has upwardly bent tabs or extensions which serve, when the over-ignition protector 92 is mounted to the diffuser base 54, for centering and, resp., aligning the over-ignition protector 92 with the diffuser sidewall 57. In one exemplary arrangement, three upwardly bent tabs of this type are arranged radially circumferentially on the over-ignition protector 92. The over-ignition protector 92 could also be designed without said tabs, i.e., as a round, especially circular, disk. The over-ignition protector 92 is fastened to the diffuser 50 such that it seals the at least one flow opening 56 or, resp., all flow openings 56 in the diffuser base 50 in a gas-tight manner. Hence, the diffuser is configured to be impermeable to gas in the area of the diffuser base 54 by the over-ignition protector 92 mounted in this way in the idle state of the gas generator 100, viz. in its non-activated state. The over-ignition protector 92 can be fastened to the diffuser base 54 by at least one welded, soldered or adhesive connection. Specifically, the over-ignition protector 92 is fastened to the inner face 53 of the diffuser base 54 by each of two fasteners separated from each other, i.e., a first fastener 96 and a second fastener 98. In one exemplary arrangement, the first fastener 96 is in the form of a spot-welded connection connecting the over-ignition protector 92 substantially at its center to substantially the center of the diffuser base 54, The second fastener 98 is in the form of a radially circumferential, substantially circular, welded connection in the vicinity of the outer edge of the over-ignition protector 92—except for the tabs thereof. Specifically, the second fastener 98 extends radially outside of all flow openings 56 of the diffuser base 54. Accordingly, with respect to the flow openings 56 of the diffuser base 54, the first fastener 96 is located radially inside and the second fastener 98 is located radially outside of the flow openings 56.

The over-ignition protector 92 additionally has a predetermined breaking point 94 which, when or after the gas generator 100 is activated, is intended to tear at or along the predetermined breaking point 94 or is intended to open the over-ignition protector 92 there by the effect of pressure or gas pressure. In the area of the predetermined breaking point 94, the over-ignition protector 92 has a smaller residual wall thickness than the remaining area of the over-ignition protector 92 surrounding the predetermined breaking point 94 and may be formed by a corresponding groove, for example. Such predetermined breaking point may have various geometric shapes such as a star shape (cross notch) or a straight and/or curved line. In one exemplary arrangement, the predetermined breaking point 94 is in the form of a radially circumferential circular continuous line and forms a concentric circle around the center of the over-ignition protector 92. In the area of said center also the first fastener 96 is disposed, i.e., the over-ignition protector 92 is welded to the diffuser base 54.

The position of the circular predetermined breaking point 94 vis-à-vis the diffuser base 54 is selected such that, when viewed in the radial direction, the predetermined breaking point 94 is located between the first fastening 96 and the flow openings 56 of the diffuser base 54. In other words, the predetermined breaking point 94 has a radially smaller distance, with respect to the point of the first fastening 96, than the flow openings 56 of the diffuser base 54, measured to the first fastening 96. In particular, in the concrete case the line of the predetermined breaking point 94 is disposed approximately in the middle of the distance between the first fastening 96 and the flow openings 56, specifically the respective radially inner delimitation of the flow openings 56.

In the present exemplary arrangement, the predetermined breaking point 94 is disposed, in the form of a circumferential groove, on an inner front face 102 of the over-ignition protector 92, viz. on the front side or front face of the over-ignition protector 92 that faces away from the diffuser base 54. However, it is also possible that, in addition to that, another circumferential groove or predetermined breaking point, i.e., exactly mirror-inverted to the predetermined breaking point 94, is disposed on the opposite side of the over-ignition protector 92 on an outer front face 104 of the over-ignition protector 92, viz. on the side facing the diffuser base 54, so that a total of two groove-shaped lines or predetermined breaking points independent of each other are disposed on the over-ignition protector 92. It is also imaginable that only one single groove or predetermined breaking point is disposed on the outer front face 104 of the over-ignition protector 92.

During assembly of the gas generator 100, the diffuser 50 can be assembled with the over-ignition protector 92 as described above to form a pre-mounted subassembly with the latter which can then be connected or fastened to the first ignition stage 1. As is evident in FIG. 1, said pre-mounted subassembly can be attached to the outer face 32 of the compressed gas tank 30, while encompassing with the open end, viz. with the opening 60 of the diffuser 50, the second end 38 of the compressed gas tank 30 of the first ignition stage 1, and can be fastened there in the region of the taper 40.

In one exemplary arrangement, the second end 38 of the compressed gas tank 30 which is sealed by the second plug 46 with the second bursting element 44 is inserted so far into the interior and, resp., through the opening 60 of the diffuser 50, until the outer housing of the compressed gas tank 30 abuts against the diffuser 50 and, resp., the opening 60 thereof, or until the portion of the compressed gas tank 30 which includes the taper 40 contacts the diffuser 50 in a region of the taper 40. There the diffuser 50 is connected to the outer face 32, specifically to the outer face of the taper 40, of the compressed gas tank 30, in particular by a radially circumferential weld.

Thus, the first ignition stage 1 protrudes over a certain axial length in the region of its second end 38 into the diffuser 50 or, resp., into the inner area of the diffuser 50 and is fastened to an inner area of the diffuser 50 in the region of the opening 60 of the diffuser 50. To this end, in the region of the opening 60 of the diffuser 50, there may be arranged a certain taper inside the diffuser 50 or an inwardly extending chamfer to increase and, resp., enhance a contact area between the diffuser 50 and the first ignition stage 1 for a corresponding fastening (welding) of said two components, as sketched in FIG. 1. During assembly of the gas generator 100, however, the diffuser 50 including the over-ignition protector 92 fastened thereto can already be fastened on the second ignition stage 4 and, thus, can comprise a pre-mounted subassembly quasi extended by the second ignition stage 4, the fastening of said subassembly to the first ignition stage 1 being carried out as above-described.

In addition to the afore-described pre-mounted subassembly of the first ignition stage 1 and the diffuser 50, connected to the diffuser 50 the second ignition stage 4 joins to complete the gas generator 100. Accordingly, the second ignition stage 4 also comprises a subassembly that includes a plurality of individual components which are advantageously already provided as a pre-mounted subassembly, before it is connected or fastened to the diffuser 50. In accordance with the present disclosure, the second ignition stage 4 comprises particularly the components of second igniter 74, second igniter holder 78, second propellant 72, a volume compensator 90 and second housing 71, and the second ignition stage 4 can be understood to be a subassembly comprising said components, respectively.

As can be seen from FIG. 1, the second housing 71 includes a substantial part of the housing or outer housing of the second ignition stage 4 and is configured as an elongate tubular component of a substantially cylindrical shape having two opposite open ends. The second housing 71 has a first end area 82 remote from the diffuser 50 and a second end area 84 facing the diffuser which is opposed to the first end area 82. The second housing 71 takes, at its second end area 84, the shape of a straight circular cylinder whose inner diameter substantially corresponds to the outer diameter of the diffuser 50, particularly in the region of the diffuser base 54 thereof. Said cylindrical shape extends over a major part of the axial length of the second housing 71 toward the first end area 82 thereof and merges, axially ahead of the first end area 82, into a constriction 80 to form an end-side opening at the first end area 82. The second igniter holder 78 is inserted in said opening of the first end area 82 over a certain axial length into the interior of the second housing 71 and seals, especially in a gas-tight manner, said opening and, resp., the first end area 82 of the second housing 71 there. The second igniter holder 78 receives and holds the second igniter 74 and is advantageously configured as a pre-mounted subassembly in the form of a second ignition unit 78. The second ignition unit 78 is inserted in the opening of the first end area 82 and is fastened there, and in one exemplary arrangement, by a radially circumferential welding. The inner area of the second housing 71 is at least partially filled with the second propellant 72, wherein advantageously part of the second propellant 72 is adjacent to the second igniter 74. Accordingly, the second propellant 72 may be provided in a type and shape identical or comparable to the first propellant 26 described in the foregoing, but it can also differ therefrom as regards the geometry, size and/or chemical composition. The volume compensator 90 may optionally be received inside the second housing 71 and may be directly adjacent to the second propellant 72 and compress or mechanically pressurize the latter in the direction of the second igniter 74 to compensate for possible empty volumes during manufacture or over the service life of the gas generator 100 which might occur at or in the filling of the second propellant 72, In so doing, the volume compensator 90 is inserted from the side of the second end area 84 of the second housing 71 into the second housing 71 until it is adjacent to the second propellant 72 and, resp., compresses the same in the direction of the second igniter 74 as desired.

When manufacturing the gas generator 100, the second ignition stage 4 can be configured as a pre-mounted subassembly comprising the second ignition unit 76, the second propellant 72 and optionally the volume compensator 90, as above-described, before the second ignition stage 4 can be mounted to the diffuser 50 with the first ignition stage 1 connected thereto so as to complete the gas generator 100.

The second ignition stage 4 is connected or fastened to the diffuser 50 such that it overlaps with the diffuser sidewall 57 over a particular distance along the outer area 51 of the diffuser 50. The second ignition stage 4 is tightly connected, and in one exemplary arrangement welded, radially circumferentially to the diffuser 50 and specifically to the diffuser sidewall 57 in the region of said overlapping distance. Such welding can be arranged in the region of the outermost end of the second end area 84 of the second housing 71. It is also imaginable, however, that a radially circumferential welding is positioned in the region of said overlapping distance starting from the second end area 84 toward the diffuser base 54, for example by a welded connection with the diffuser 50 which passes fully through the material thickness of the second housing 71. Before one of the afore-mentioned welded connections is applied, the second ignition stage 4 can be slipped on to an appropriate extent over the diffuser base 54 along the diffuser sidewall 57 and, resp., the diffuser 50 can be inserted with its end including the diffuser base 54 to an appropriate extent into the interior of the second ignition stage 4, and in one exemplary arrangement, by a fit, in particular press-fit. Accordingly, the second ignition stage 4 encompasses, in the region of its second end area 84, the diffuser 50 at its outer area 51 over a/the overlapping distance and is fastened there to the diffuser 50.

As an alternative, it is also possible that such afore-mentioned encompassing of the diffuser 50 by the second ignition stage 4 is not provided, but that the second ignition stage 4 contacts the diffuser base 54 in an obtuse manner or rests there and is fastened, and in one exemplary arrangement, welded, there (not shown in the Figures). In one exemplary arrangement, the outer diameter of the second ignition stage 4 in the second end area 84 can substantially correspond to the outer diameter of the diffuser 50 in the region of the diffuser base 54.

Inside the second ignition stage 4, a second combustion chamber 70 is formed which can be regarded substantially as the space or the volume which is formed in the inner area of the second housing 71 between the diffuser base 54 and the second ignition unit 76. Accordingly, as can be seen from FIG. 1, the second propellant 72 as well as the volume compensator 90 are stored inside the combustion chamber 70. Especially advantageously, in one exemplary arrangement, the diffuser base 54 not only forms an axially terminating wall of the diffuser 50 but, at the same time, also an axially terminating wall for the second combustion chamber 70 of the second ignition stage 4.

As already afore-described, the gas generator 100 can be manufactured in an extremely simple and cost-saving manner by interconnecting only three subassemblies prefabricated separately from each other, i.e., the first ignition stage 1, the diffuser 50 with the over-ignition protector 92 fastened thereto and the second ignition stage 4, wherein said subassemblies form respective outer housing portions of the gas generator 100 and are positioned relative to each other particularly so that the first ignition stage 1 is inserted into the interior of and connected to the diffuser 50, and subsequently the extended structural unit formed in this way comprising the first ignition stage 1 and the diffuser 50 with the over-ignition protector 92 is inserted as a structural unit into the interior of the second stage 4 and is fastened thereto to complete the gas generator 100. A somewhat modified assembling sequence may provide that initially the diffuser 50 with the over-ignition protector 92 already mounted thereto is connected to the second ignition stage 4 and, thus, a first prefabricated subassembly of the gas generator 100 is present which is then attached and tightly connected to the first ignition stage 1 so as to complete the gas generator 100.

In the following, the function of the gas generator 100 during intended operation thereof and, in so doing, particularly the function of the over-ignition protector 92 shall be illustrated. If a signal for activating the gas generator 100 is given, the latter is moved from an idle position to an activated or triggered position by activating the first ignition stage 1. For this purpose, the first igniter 16 is activated and, resp., triggered and releases a particular amount of energy, especially in the form of hot particles and/or hot gases in the direction of the ignition chamber 20. If the booster charge 20 is present, the latter is ignited and, resp., activated thereby and, in turn, releases another amount of energy in the form of hot particles and/or hot gases, thus causing an internal pressure inside the ignition chamber 20 to increase so that the first bursting element 24 is opened. If no booster charge 24 is present, the effect and, resp., the energy of the first igniter 16 is already sufficient to open the first bursting element 24.

After that, the first propellant 26 is ignited or activated and burnt by the energy of the first igniter 16 and, where necessary, by the energy of the booster charge 22, causing an amount of gas to be generated which is intended to exit the gas generator 100 to be used for operating the vehicle safety system. Thus, the internal pressure in the compressed gas tank 30 increases such that the second bursting element 44 is opened and the gas can flow into the diffuser 50 and, resp., into the interior of the diffuser 50 and, after that, can pass through the outlet openings 58 thereof to the environment of the gas generator 100. When a preloaded compressed gas is present prior to activation of the gas generator 100 inside the compressed gas tank 30, said preloaded compressed gas can also flow through the opened second bursting element 44 into the diffuser 50 and, after that, to the environment of the gas generator 100. In case that no first propellant 26 is present and the compressed gas tank 30 is filled only with a preloaded compressed gas prior to activation of the gas generator 100, the energy of the first igniter 14 and, where necessary, of the booster charge 22 is sufficient to activate the compressed gas and equally cause the internal pressure to increase inside the compressed gas tank 30 such that the second bursting element 44 is opened.

The afore-described triggering and, resp., activation of merely the first ignition stage 1 and, thus, no triggering of the second ignition state 4 may be desired for the vehicle safety system and, resp., for the gas generator 100 in specific release situations or crash situations. Consequently, in this case the second ignition stage 4 must be prevented from being inadvertently activated, particularly by thermal influences by activation of the first ignition stage 1. For this purpose, the over-ignition protector 92 is disposed in the inner area of the diffuser 50 on the diffuser base 54 so that the flow openings 56 are covered and, resp., blocked for a gas flow, as described in the foregoing. Thus, the over-ignition protector 92 prevents hot gases from flowing through the flow openings 56 of the diffuser base 54 into the second combustion chamber 70 and prevents the second propellant 72 of the second ignition stage 4 from being inadvertently ignited in case that merely the first ignition stage 1 of the gas generator 100 is to be activated as intended. In other words, the over-ignition protector 92 prevents the first ignition stage 1 from inadvertently over-igniting to the second ignition stage 4.

For the application case that, in addition to the first ignition stage 1, also the second ignition stage 4 is to be activated (simultaneously or time-shifted) as intended, the second ignition stage 4 is equally activated after or when the first ignition stage 1 is triggered/activated. Accordingly, triggering/activation of the second igniter 74 initiates the activation of the second ignition stage 4, and the second propellant 72 in the second combustion chamber 70 is ignited/activated and burnt, thereby also generating an amount of gas that is intended to exit the gas generator 100 to be used for operating the vehicle safety system. This amount of gas supplements the amount of gas generated by the first ignition stage 1 and mixes particular with the latter amount of gas in the inner area of the diffuser 50, before the gas or an appropriate gas mixture can exit the gas generator 100 to the outside through the outlet openings 58 thereof. Specifically, along with the generation of the amount of gas by combustion of the second propellant 72, the internal pressure in the combustion chamber 70 increases so that the over-ignition protector 92 is torn and opened in the region of its predetermined breaking point(s) 94 to release a path for the gas out of the combustion chamber 70 through the flow openings 56 of the diffuser base 54 into the interior of the diffuser 50. It is of particular advantage when the over-ignition protector 92 is fastened on the diffuser base 54 using two separate fastening sections, i.e., by the first fastening 96 at the center of the over-ignition protector 92 and by the second fastening 98 in the form of a radially circumferential fastening being radially spaced therefrom, as described in the foregoing. When the over-ignition protector 92 is opened as intended by activation of the second ignition stage 4, it is thus advantageously possible that a wed-defined gap can be produced as a flow opening at the over-ignition protector 92 for the gas flowing out of the second combustion chamber 70 by a well-defined locally extremely confined tearing of the over-ignition protector 92 along its predetermined breaking point 94, in particular when the predetermined breaking point 94 is in the form of a round radially circumferential groove. Due to the fact that the over-ignition protector 92 is additionally held on the diffuser base 54 by the central first fastener 96, apart from the second fastener 98, when the over-ignition protector 92 is opened, when opening/tearing the over-ignition protector 92 merely extremely small deformations and no large-area deforming regions of the over-ignition protector 92 are formed which might detrimentally obstruct a gas flow. On the other hand, in a known star embossing on an over-ignition protector which has no central first fastening, there would occur a possibly detrimental known "flower-like" tearing or opening of the over-ignition protection, which can be prevented by the present disclosure.

Figure 2:
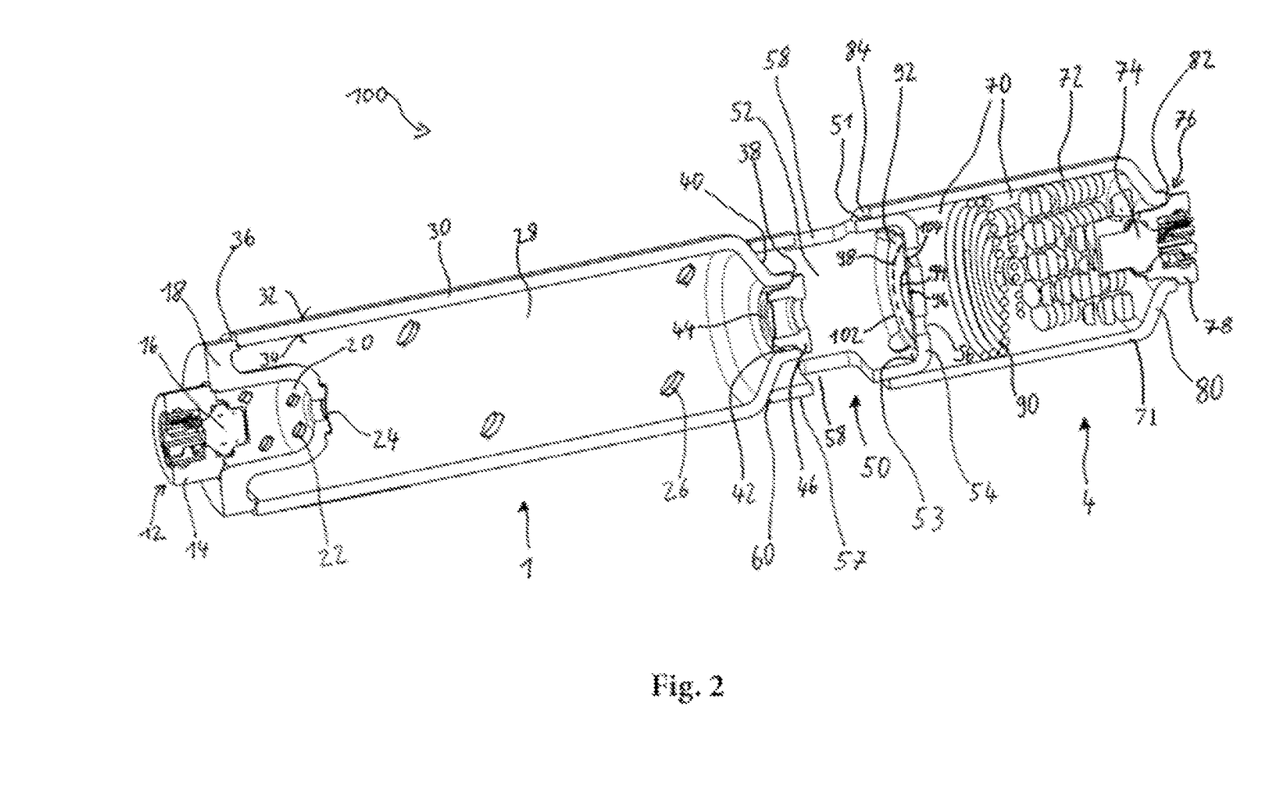
FIG. 2 shows a perspective view of the gas generator according to the disclosure of FIG. 1.

FIG. 2 illustrates a perspective view of the afore-described gas generator 100 as shown in FIG. 1. In FIG. 2, the same reference numerals as in FIG. 1 apply to equal and equally acting parts. Since the gas generator 100 as shown in FIG. 2 is the same exemplary arrangement of the gas generator 100 as shown in FIG. 1, a detailed description of FIG. 2 is omitted and reference is made in this respect to the description of FIG. 1.

However, in FIG. 2, particularly with respect to the over-ignition protector 92, the course and the positioning of the predetermined breaking point 94 thereof and the first and second fastenings 96, 98 thereof on the diffuser base 54 are evident in an even more detailed manner, as will be described hereinafter. The over-ignition protector 92 is centrally fastened to the middle thereof by the first fastening 96 on the diffuser base 54, especially by spot welding there, as is indicated by a symbolic weld spot in FIG. 2.

Starting from the first fastening 96, a circular continuous line representing the predetermined breaking point 94 is visible in the radial direction on the over-ignition protector 92. In the present case, the predetermined breaking point 94 is arranged as a fully circumferential recess in the form of a groove on the inner front face 102 of the over-ignition protector 92 which faces in the direction of the first ignition stage 1. It would also be imaginable to dispose, instead of or in addition to said one predetermined breaking point 94, a, particularly identically shaped, predetermined breaking point on the opposite side, viz. the outer front face 104, of the over-ignition protector 92.

Starting from the predetermined breaking point 94, a circular broken line representing the second fastening 98 of the over-ignition protector 92 on the diffuser base 54 is evident in the radial direction outwardly on the over-ignition protector 92. The second fastening 98 may be in the form of a fully circumferential welded connection.

Also, in FIG. 2 the upwardly bent tabs and extensions arranged on the outer edge area of the over-ignition protector 92 are visible which are adjacent to the diffuser sidewall 57 and serve for centering the over-ignition protector 92, particularly during assembly.

Figure 3:
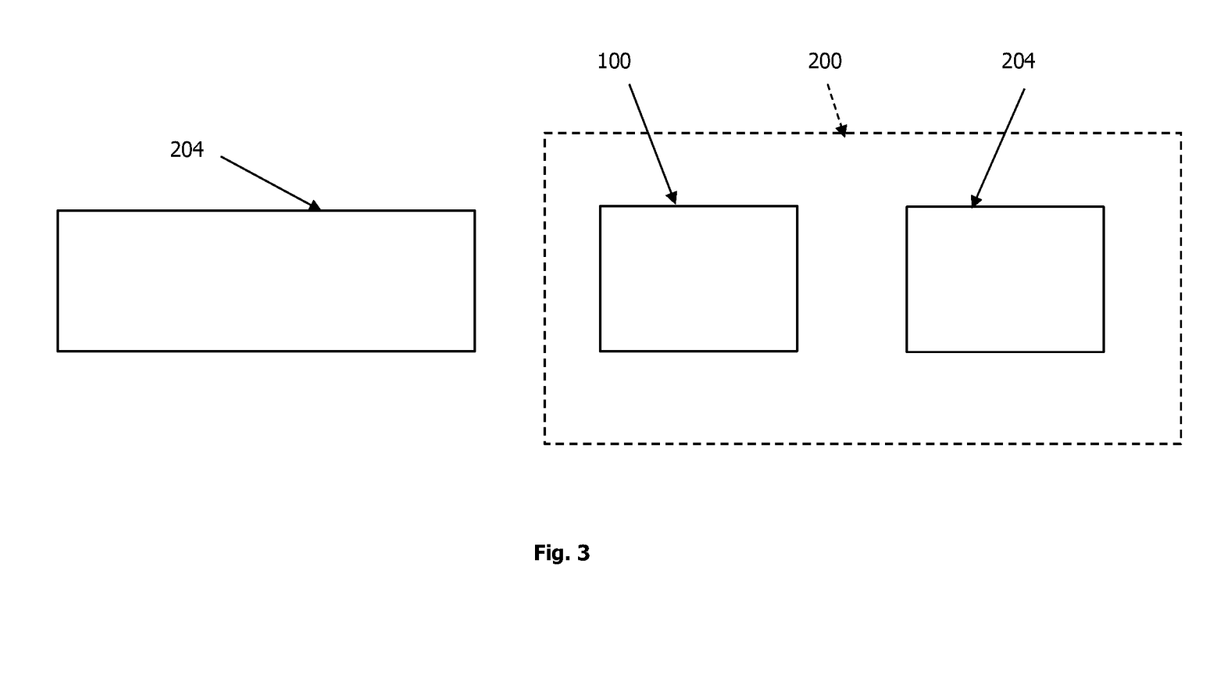
FIG. 3 shows a schematic of an airbag module including the gas generator of FIG. 1, connected to an airbag.

Referring to FIG. 3, a schematic of an airbag module 200 is depicted. The airbag module 200 includes the gas generator 100 and an airbag electronic control unit 202 that is configured to activate an airbag 204 if a tigger situation is given.

The invention claimed is:

1. A gas generator for a vehicle safety system, comprising a first ignition stage, a cup-shaped diffuser having a diffuser base and an adjacent diffuser sidewall extending from the base, and comprising a second ignition stage, wherein the first ignition stage, the diffuser and the second ignition stage are arranged along an axial longitudinal axis of the gas generator—and the diffuser is positioned between the first and second ignition stages such that the second ignition stage is fastened to an outer area of the diffuser.

2. The gas generator according to claim 1, wherein the diffuser base forms a longitudinally axial termination of the diffuser, and/or the second ignition stage is fastened to the diffuser sidewall or the diffuser base.

3. The gas generator according to claim 2, wherein the diffuser overlaps with and is fastened to the second ignition stage over a particular distance along an outer area of its diffuser sidewall, wherein at the distance of the overlap an outer diameter of the diffuser substantially corresponds to an inner diameter of the second ignition stage.

4. The gas generator according to claim 2, wherein the diffuser base seals an open second end area of the second ignition stage and/or forms a terminating wall for a second combustion chamber of the second ignition stage.

5. The gas generator according to claim 1, wherein the diffuser overlaps with and is fastened to the second ignition stage over a particular distance along an outer area of its diffuser sidewall, wherein at the distance of the overlap an outer diameter of the diffuser substantially corresponds to an inner diameter of the second ignition stage.

6. The gas generator according to claim 5, wherein the first ignition stage, the diffuser and the second ignition stage form respective outer housing portions of the gas generator and are positioned relative to each other such that the first ignition stage is inserted in an interior of the diffuser and the diffuser is inserted in the interior of the second stage each along a particular axial length.

7. The gas generator according to claim 1, wherein
the diffuser base seals an open second end area of the second ignition stage and/or forms a terminating wall for a second combustion chamber of the second ignition stage.

8. The gas generator according to claim 1, wherein
the diffuser includes at least one outlet opening in a diffuser sidewall and at least one flow opening in a diffuser base, wherein the at least one outlet opening is configured as a slotted opening extending radially in the circumferential direction.

9. The gas generator according to claim 8, wherein in a non-activated state of the gas generator, the at least one outlet opening is unsealed and the at least one flow opening is sealed by an over-ignition protector, wherein the over-ignition protector forms part of a terminating wall for a second combustion chamber of the second ignition stage.

10. The gas generator according to claim 8, wherein the at least one flow opening is configured as a round opening.

11. The gas generator according to claim 1, wherein the gas generator is a hybrid gas generator, the first ignition stage of which has a compressed gas tank which receives, in a non-activated state of the gas generator, compressed gas or a compressed gas mixture and a first propellant.

12. The gas generator according to claim 11, wherein the second ignition stage of the gas generator is a purely pyrotechnic stage comprising a second propellant.

13. The gas generator according to claim 12, wherein the diffuser forms an axial termination of the outer housing of the second ignition stage which is axially opposed to a second ignition unit forming another termination of the outer housing of the second ignition stage.

14. An airbag module comprising a gas generator, an airbag inflatable by the gas generator and a fastener for attaching the airbag module to a vehicle, wherein
the gas generator is configured according to claim 1.

15. A vehicle safety system for the protection of a person, such as a vehicle occupant or a pedestrian, comprising a gas generator, an airbag inflatable by the latter as part of an airbag module, and an electronic control unit by which the gas generator can be activated, if a trigger situation is given, wherein
the gas generator is configured according to claim 1.

16. The gas generator according to claim 1, wherein the gas generator is a purely pyrotechnic gas generator which includes no compressed gas in its non-activated state.

17. A gas generator for a vehicle safety system, comprising:
a first ignition stage,
a cup-shaped diffuser having a diffuser base and an adjacent diffuser sidewall, and
a second ignition stage,
wherein the first ignition stage, the diffuser and the second ignition stage are arranged along an axial longitudinal axis of the gas generator and the diffuser is positioned between the first and second ignition stages such that the second ignition stage is fastened to an outer area of the diffuser,
wherein the first ignition stage, the diffuser and the second ignition stage form respective outer housing portions of the gas generator and are positioned relative to each other such that the first ignition stage is inserted in an interior of the diffuser and the diffuser is inserted in an interior of the second stage each along a particular axial length.

18. A gas generator for a vehicle safety system, comprising:
a first ignition stage,
a cup-shaped diffuser having a diffuser base and an adjacent diffuser sidewall, and
a second ignition stage,
wherein the first ignition stage, the diffuser and the second ignition stage are arranged along an axial longitudinal axis of the gas generator and the diffuser is positioned between the first and second ignition stages such that the second ignition stage is fastened to an outer area of the diffuser; and
wherein the diffuser includes at least one outlet opening in a diffuser sidewall and at least one flow opening in a diffuser base, wherein the at least one outlet opening is configured as a slotted opening extending radially in a circumferential direction;
wherein in a non-activated state of the gas generator, the at least one outlet opening is unsealed and the at least one flow opening is sealed by an over-ignition protector, wherein the over-ignition protector forms part of a terminating wall for a second combustion chamber of the second ignition stage;
wherein the over-ignition protector has a predetermined breaking point and is fastened on the diffuser base on an inner face thereof, by a first fastening and/or a second fastening.

19. The gas generator according to claim 18, wherein the predetermined breaking point is positioned on two front faces of the over-ignition protector.

20. The gas generator according to claim 19, wherein the first fastening is a spot-welded connection and the second fastening is a radially circumferential welded connection.

* * * * *